A. FALK.
BOX AND SLIDING COVER.
APPLICATION FILED APR. 17, 1908.

912,658.

Patented Feb. 16, 1909.

Witnesses
Inventor
Arthur Falk
By E. W. Cady
Attorney

UNITED STATES PATENT OFFICE.

ARTHUR FALK, OF NEW YORK, N. Y.

BOX AND SLIDING COVER.

No. 912,658.　　　　Specification of Letters Patent.　　　Patented Feb. 16, 1909.

Application filed April 17, 1908.　Serial No. 427,759.

*To all whom it may concern:*

Be it known that I, ARTHUR FALK, a citizen of the United States, and resident of New York city, in the county of New York and State of New York, have invented certain new and useful Improvements in Boxes and Sliding Covers, of which the following is a specification.

This invention relates to boxes and cans provided with an opening in the top and a sliding cover, for closing said opening.

The invention has especial reference to boxes and cans for containing granulated tobacco and other substances of a pulverized or granulated nature in which an opening is provided in the top of the box at one end thereof, so that the tobacco, or other substance may be poured out by tilting the box, and a sliding cover is mounted on the top of the box and is adapted to be moved over and away from said opening to close and uncover the same.

The invention consists in an improved box, and a sliding cover of this description constructed and arranged as hereinafter set forth and claimed.

Figure 1:
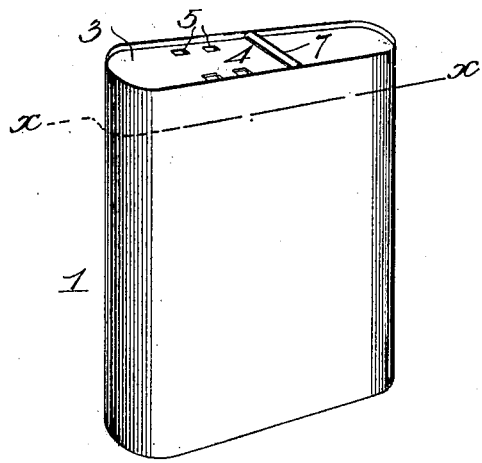
Figure 2:
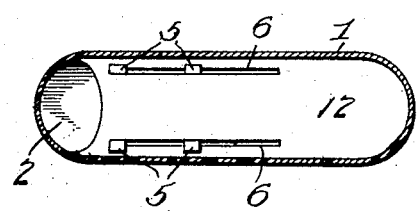
Figure 3:
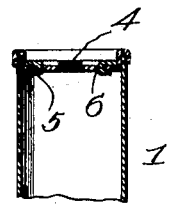
Figure 4:
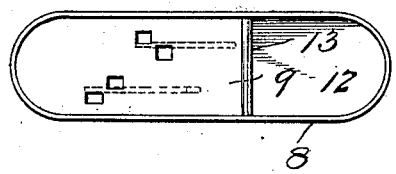

Referring to the accompanying drawing—Figure 1 is a perspective view of a box and cover in accordance with this invention. Fig. 2 is a section thereof on the line X—X Fig. 1. Fig. 3 is a transverse section thereof. Fig. 4 is a plan view of a modification, and Fig. 5 is a section thereof.

In carrying out the invention a box 1, of tin or other suitable material, is formed with an opening 2, at one end of the top 3 of the box for convenience in pouring out granular tobacco, or other substance. A sliding cover 4 is mounted on the top of the box and is slidably connected thereto by tongues or projections 5, cut in the cover 4, and bent down, and extending through longitudinal slots 6, in the top of the box 1, as shown in figures. The tongues 5, are bent under the top to hold the cover in engagement therewith and are arranged in pairs, which serve to steady the cover on the top, and afford a firm and secure connection of the cover with the top. The cover 4 is provided with a suitable handle 7, and as here shown, consisting of the rolled up end of the cover.

Figure 5:
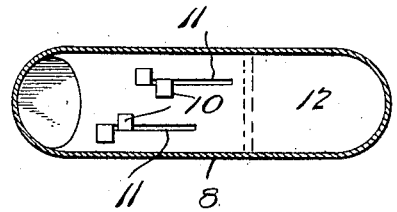

In the modification shown in Figs. 4 and 5, a box 8 has a cover 9 provided with tongues or projections 10 cut in the cover 9, and arranged in pairs, the tongues in each pair being a slight distance apart, and in line with each other and bent down and extending through slots 11 in the top 12, and are located apart from each other, and in staggered relation to each other as shown. The tongues 10 are bent under the top 12 to hold the cover 9 in sliding engagement with the top, the tongues in each pair being bent over in opposite directions to each other. This arrangement of slots and tongues engages the cover firmly and steadily with the top, and prevents play of the cover. The cover 9 has a suitable handle 13. The boxes here shown are provided with a flange 14, but the cover may be used with other forms of boxes.

Having described the invention, I claim—

1. The combination with a box, having a top with an opening at one end and longitudinal slots in staggered relation to each other, of a slidable cover having tongues engaging said slots, and the under side of the top.

2. The combination with a box having a top with an opening at one end and longitudinal slots in staggered relation to each other, of a slidable cover having tongues extending down through said slots and bent under the top of the box in opposite directions to each other.

3. The combination with a box having a top with an opening at one end and longitudinal slots in staggered relation to each other, of a slidable cover having pairs of tongues bent down through said slots, and under the top of the box in opposite directions, and in sliding engagement with the top of the box.

4. The combination with a box having a top with an opening at one end, and parallel slots, one in advance of the other, of a slidable cover, having pairs of tongues, extending through the slots, and bent under the top of the box; each tongue of the pair of tongues being adjacent to each other, and bent away from each other in opposite directions.

Signed at New York city, in the county of New York and State of New York this 13th day of April A. D. 1908.

ARTHUR FALK.

Witnesses:
　CHARLES L. LIVINGSTON,
　WM. BONDY.